(12) United States Patent  (10) Patent No.: US 9,266,176 B2
Livacich et al.  (45) Date of Patent: Feb. 23, 2016

(54) ARROW SHAFT ROTARY CUTTING SYSTEMS

(75) Inventors: John Livacich, Sunnyvale, CA (US); Kendyl A. Román, Sunnyvale, CA (US)

(73) Assignee: Evrio, Inc., Santa Clara, CA (US)

( * ) Notice: Subject to any disclaimer, the term of this patent is extended or adjusted under 35 U.S.C. 154(b) by 1348 days.

(21) Appl. No.: 13/004,879

(22) Filed: Jan. 11, 2011

(65) Prior Publication Data

US 2011/0192264 A1  Aug. 11, 2011

Related U.S. Application Data

(60) Provisional application No. 61/335,818, filed on Jan. 11, 2010.

(51) Int. Cl.
*B23D 45/00* (2006.01)
*B23D 47/04* (2006.01)

(52) U.S. Cl.
CPC ............ *B23D 45/003* (2013.01); *B23D 47/045* (2013.01); *Y10T 83/7684* (2015.04)

(58) Field of Classification Search
CPC .... B23D 45/003; B23D 45/12; B23D 47/045; B24B 55/04; Y10T 4/21; Y10T 83/73; Y10T 83/732; Y10T 83/7684; F16P 1/04
USPC .......... 83/471, 441, 441.1, 54, 381, 382, 594, 83/860, 544–546, 478; 30/90.3, 94, 96, 30/97, 101, 102, 122; 82/101, 113, 152; 269/288; 74/608, 609, 612; 451/451–457; 144/48.5, 48.6, 251.1

See application file for complete search history.

(56) References Cited

U.S. PATENT DOCUMENTS

| 1,812,645 | A | * | 6/1931 | Bergson | 83/438 |
| 1,896,536 | A | * | 2/1933 | Belshaw | 269/38 |
| 2,340,553 | A | * | 2/1944 | Obear et al. | 451/231 |
| 2,491,957 | A | * | 12/1949 | Dilley | 160/351 |
| 2,761,450 | A | * | 9/1956 | Sandy | 606/174 |
| 3,998,254 | A | * | 12/1976 | Morin | 144/35.1 |
| 5,136,909 | A | * | 8/1992 | Mellick | 83/762 |
| 6,044,744 | A | * | 4/2000 | Eslambolchi et al. | 83/880 |
| 7,159,496 | B2 | * | 1/2007 | Maes | 83/452 |
| 7,530,884 | B2 | * | 5/2009 | Parillo et al. | 451/45 |
| 2007/0105484 | A1 | * | 5/2007 | Parillo et al. | 451/28 |

OTHER PUBLICATIONS http://www.kentuckyhunting.net/forums/showthread.php?38727-Homemade-arrow-saw; Jan. 28, 2007.*

* cited by examiner

*Primary Examiner* — Laura M Lee

(57) ABSTRACT

Improved arrow shaft rotary cutting systems for home arrow makers. An arrow shaft rotary cutting system comprises a safety box configured to mount a rotary cutting tool and a means for holding each arrow shaft at a predetermined length while being cut by the blade of the rotary cutting tool. Various embodiments of novel safety boxes and novel end pieces are provided. Some embodiments use arrow shafts as system shafts that separate the safety box and the end piece. The cutting length is set to a predetermined length. Arrow shafts are cut to the predetermined length within the safety box. Other heavier duty embodiments, which include a clear safety shield, use angle iron to hold the end piece.

15 Claims, 22 Drawing Sheets

ARROW SHAFT ROTARY CUTTING SYSTEMS

RELATED APPLICATIONS

Figure 1:
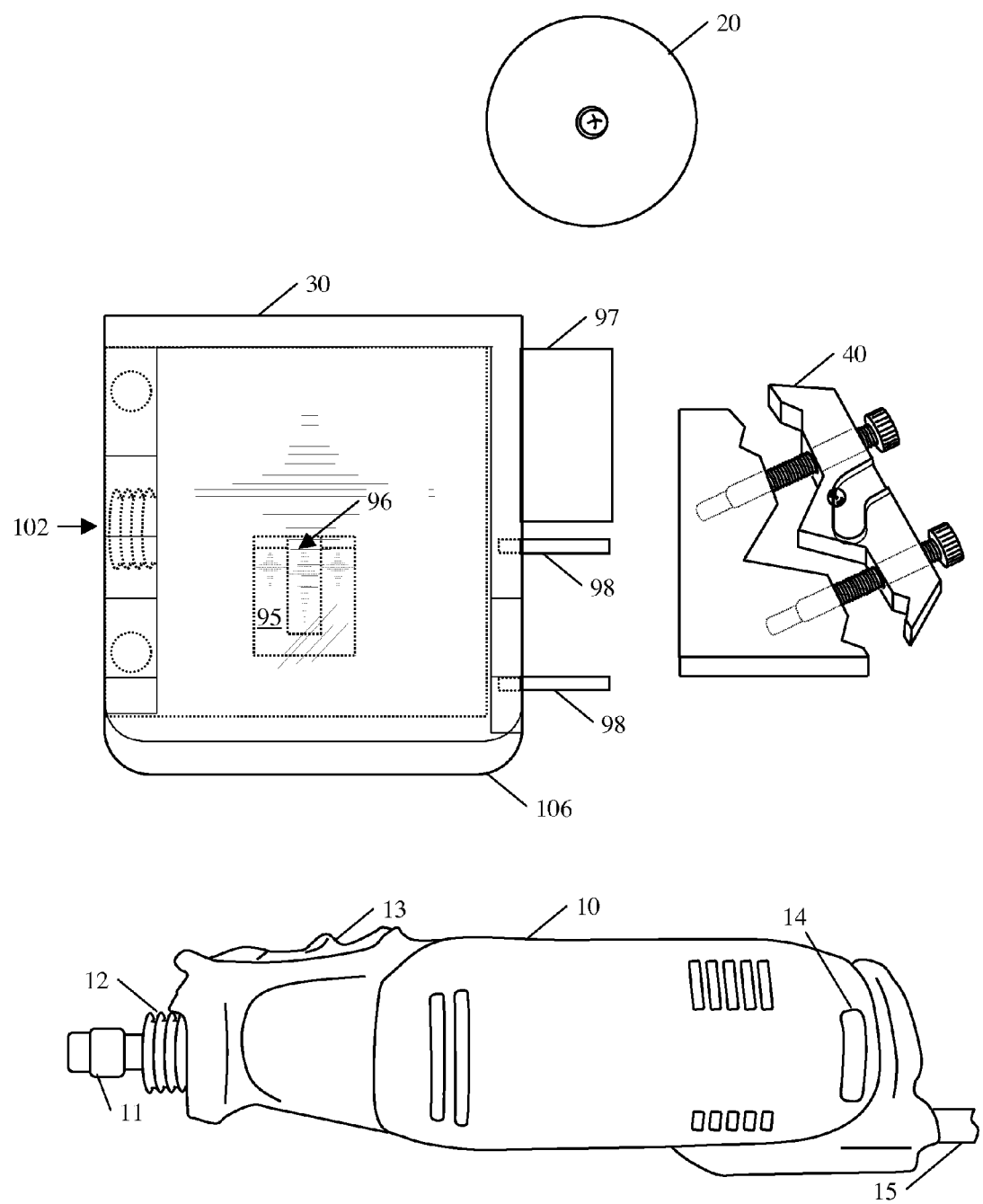

This application claims priority based on provisional patent application 61/335,818, which was filed Jan. 11, 2010. A related design patent application 29/348,777 was filed Feb. 10, 2010.

BACKGROUND

1. Field of the Invention

The present invention relates to systems for cutting arrow shafts, in particular the invention related to improved adjustable, lightweight, portable, low cost arrow shaft rotary cutting system with improved operator safety.

2. Description of Prior Art

Bows and arrows have been used for sport, hunting, and military uses for thousands of years. For most of that time, arrows have been hand crafted from wood and other natural materials by the archer or the archer's family. Recently, arrows have become mass-produced. Today, many new materials such as plastic, fiberglass, aluminum, and carbon fiber are available.

An arrow typically comprises a shaft with a head or tip on one end and a nock on the other end. Fletching or feathers or vanes are positioned near the rear of the arrow. In a footed arrow the shaft comprises hardwood near the head and softwood in the rest of the shaft.

An arrow is typically shot using the arms to pull back the bow string, and to aim and sight by holding the bow and arrow next to the archer's eye. Many characteristics of the bow, the arrow, and the archer affect the flight of the arrow. Thus, an arrow, especially the length of an arrow, is still a very personal thing to an archer. Even today, archers prefer to have their arrows cut to a custom length. An archer typically has to go to a shop to have the arrows cut and assembled. Arrow shops use large, expensive arrow saws that cost several hundred dollars. Easton and Apple make such arrow saws. Once the arrow shaft has been cut in the shop, the archer tends to have the shop perform other arrow construction such as fletching and adding arrow tips for additional service fees.

What is needed is an improved adjustable, lightweight, portable, low cost arrow shaft rotary cutting system that can be operated safely by an archer or a family member in a home.

SUMMARY OF THE INVENTION

Our improved arrow shaft rotary cutting system comprises a safety box configured to mount a rotary cutting tool and a means for holding each arrow shaft at a predetermined length while being cut by the blade of the rotary cutting tool.

Accordingly, it is an objective of the present invention to provide a rotary cutting system that can be acquired at a low cost and safely used at home by members of an archer's family to personalize arrows to be used by the archer.

OBJECTS AND ADVANTAGES

Accordingly, the present invention includes the following advantages:

a) To provide an inexpensive arrow shaft rotary cutting system.
b) To provide an adjustable arrow shaft rotary cutting system.
c) To provide a simpler way of making arrow shaft rotary cutting system.
d) To provide an easy to store arrow shaft rotary cutting system.
e) To provide an easy to transport arrow shaft rotary cutting system.
f) To provide a lightweight arrow shaft rotary cutting system.
g) To provide a simple way to manufacture arrow shaft rotary cutting systems.
h) To provide an inexpensive way to manufacture arrow shaft rotary cutting systems.
i) To provide a simple way to package and ship arrow shaft rotary cutting systems.
j) To provide an arrow shaft rotary cutting system made of parts with consistent sizes to minimize manufacturing and make it easier to assemble.
k) To provide an arrow shaft rotary cutting system comprising a rotary tool which can be used independently for many other uses.

DRAWING FIGURES

Figure 2:
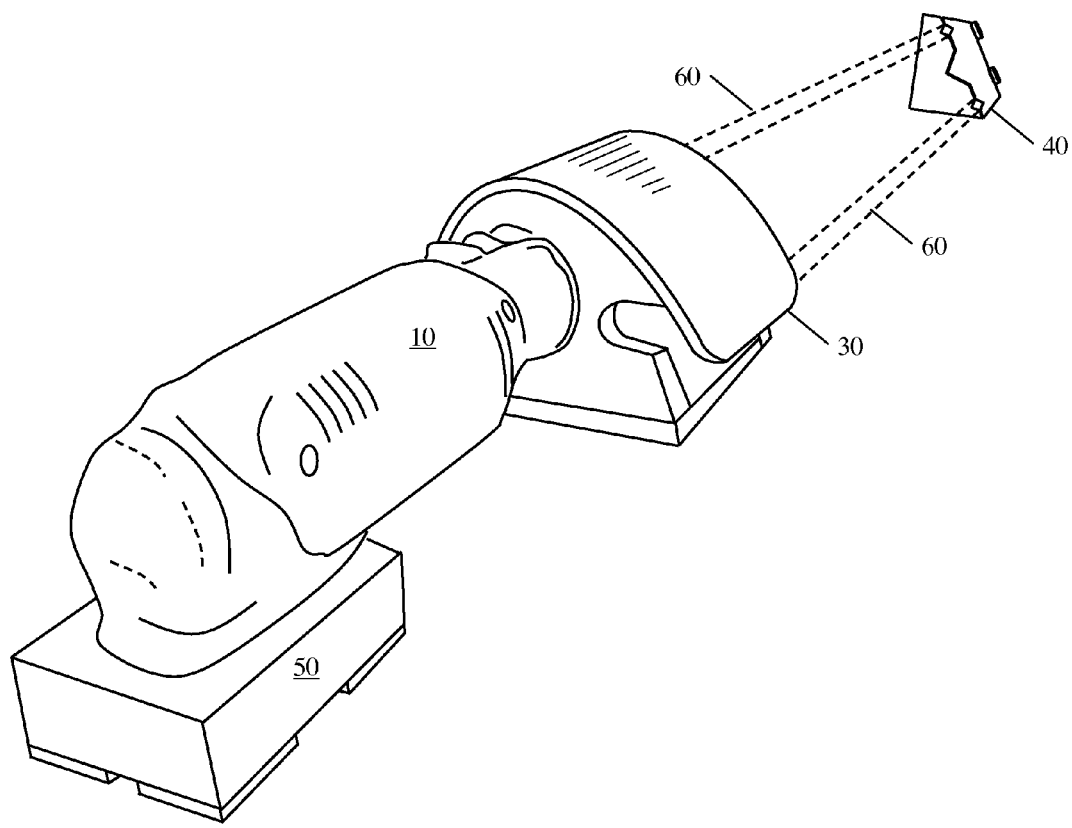
Figure 3:
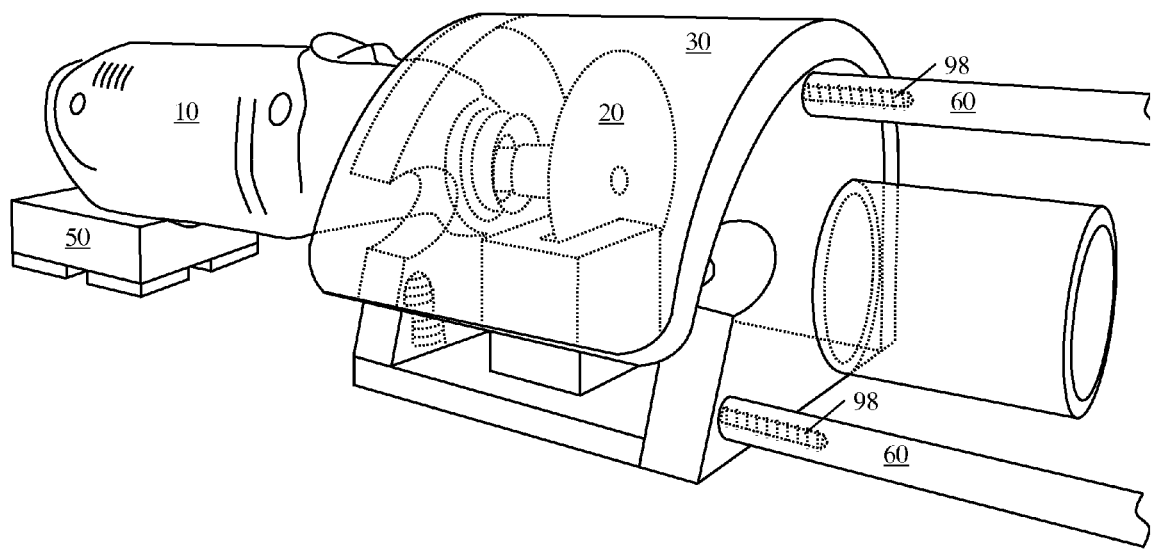
Figure 4:
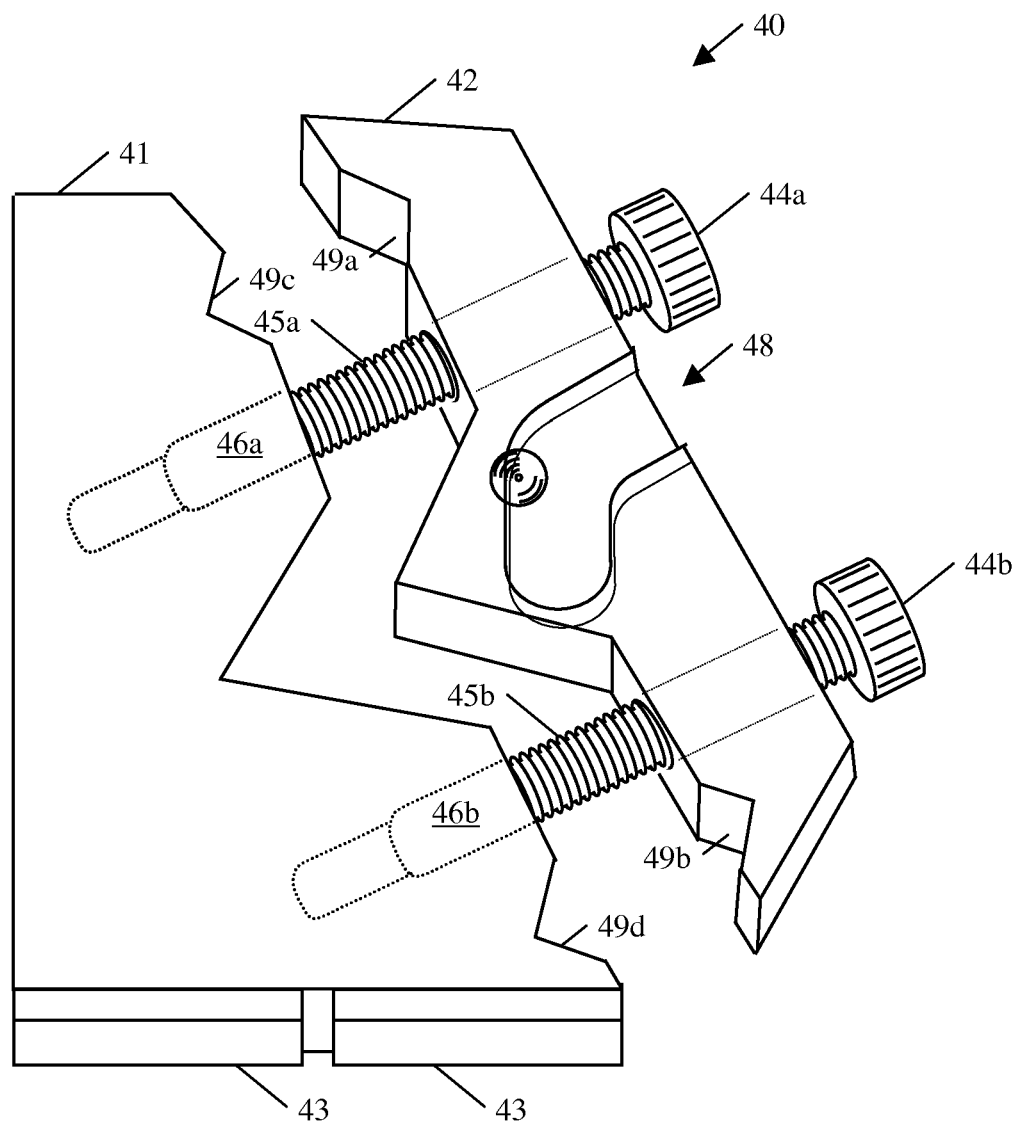
Figure 5:
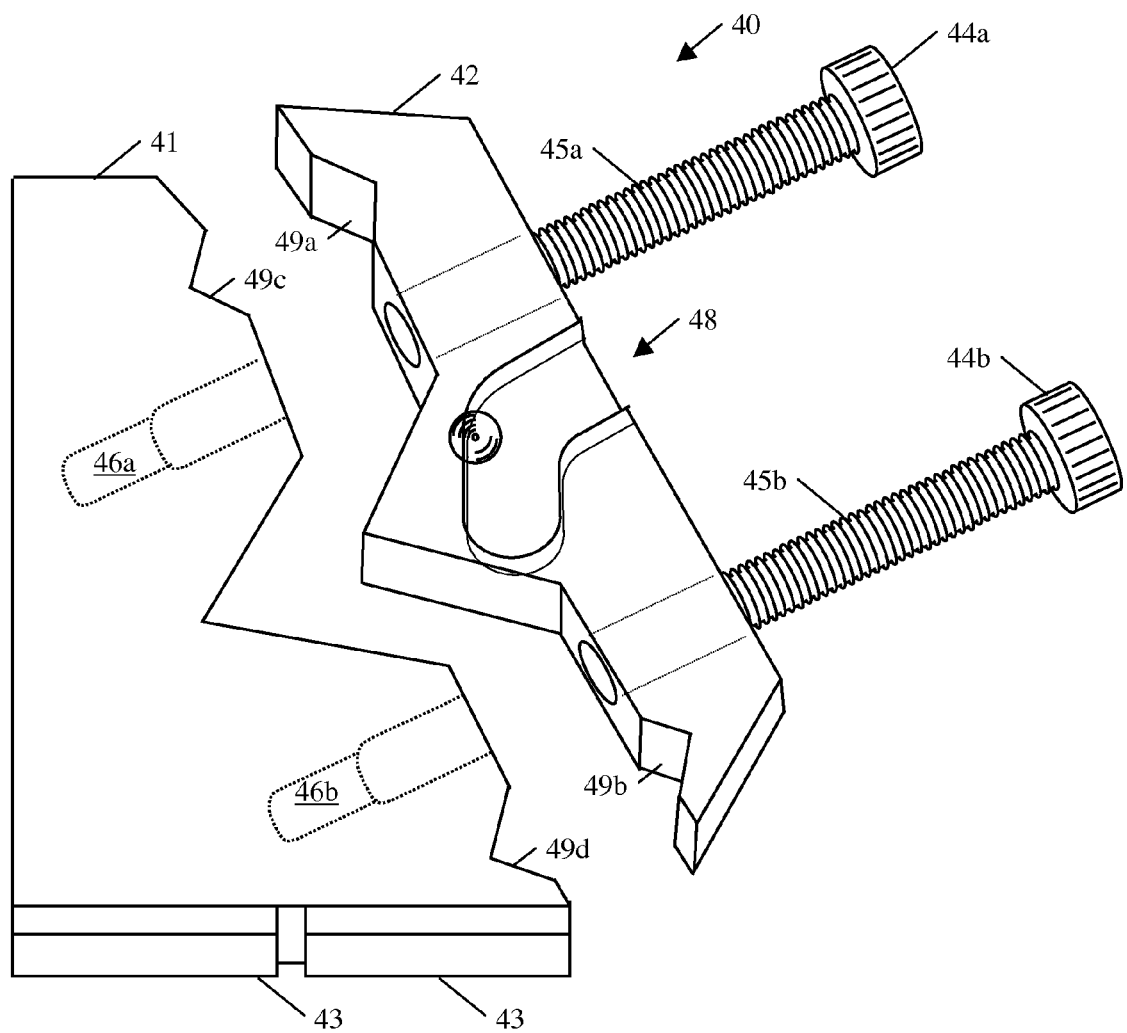
Figure 6:
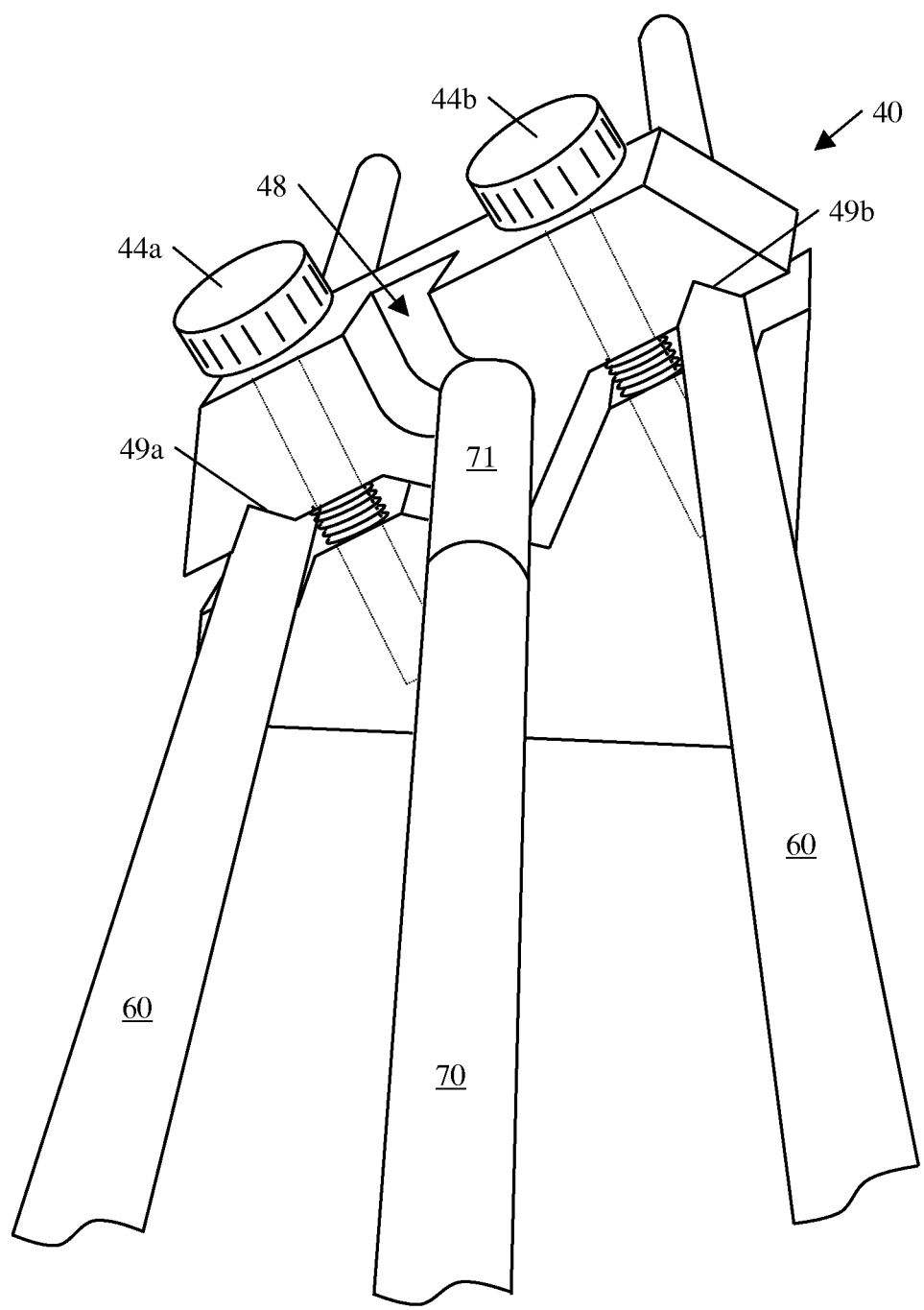
Figure 7:
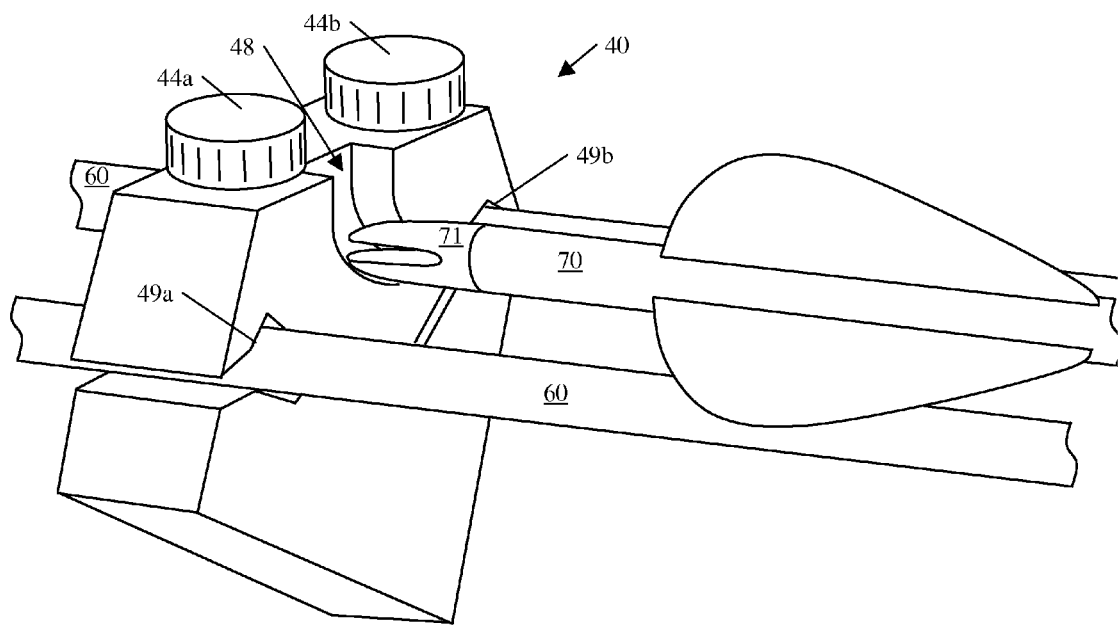
Figure 8:
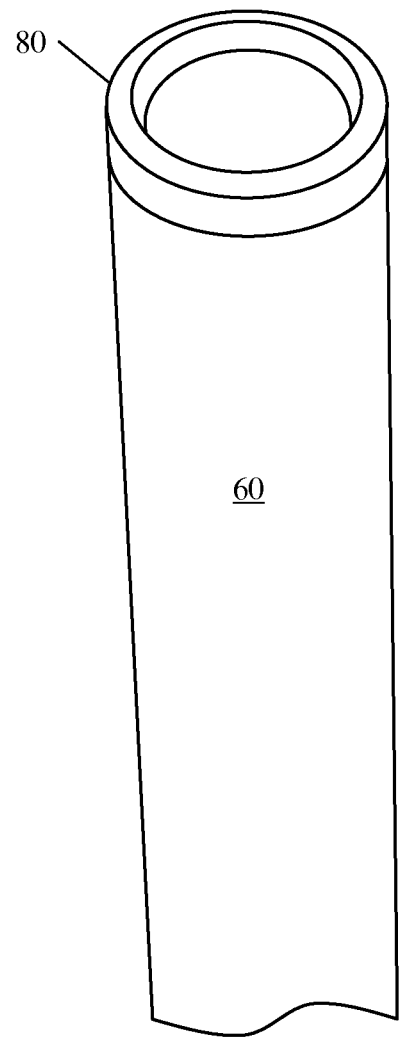
Figure 9:
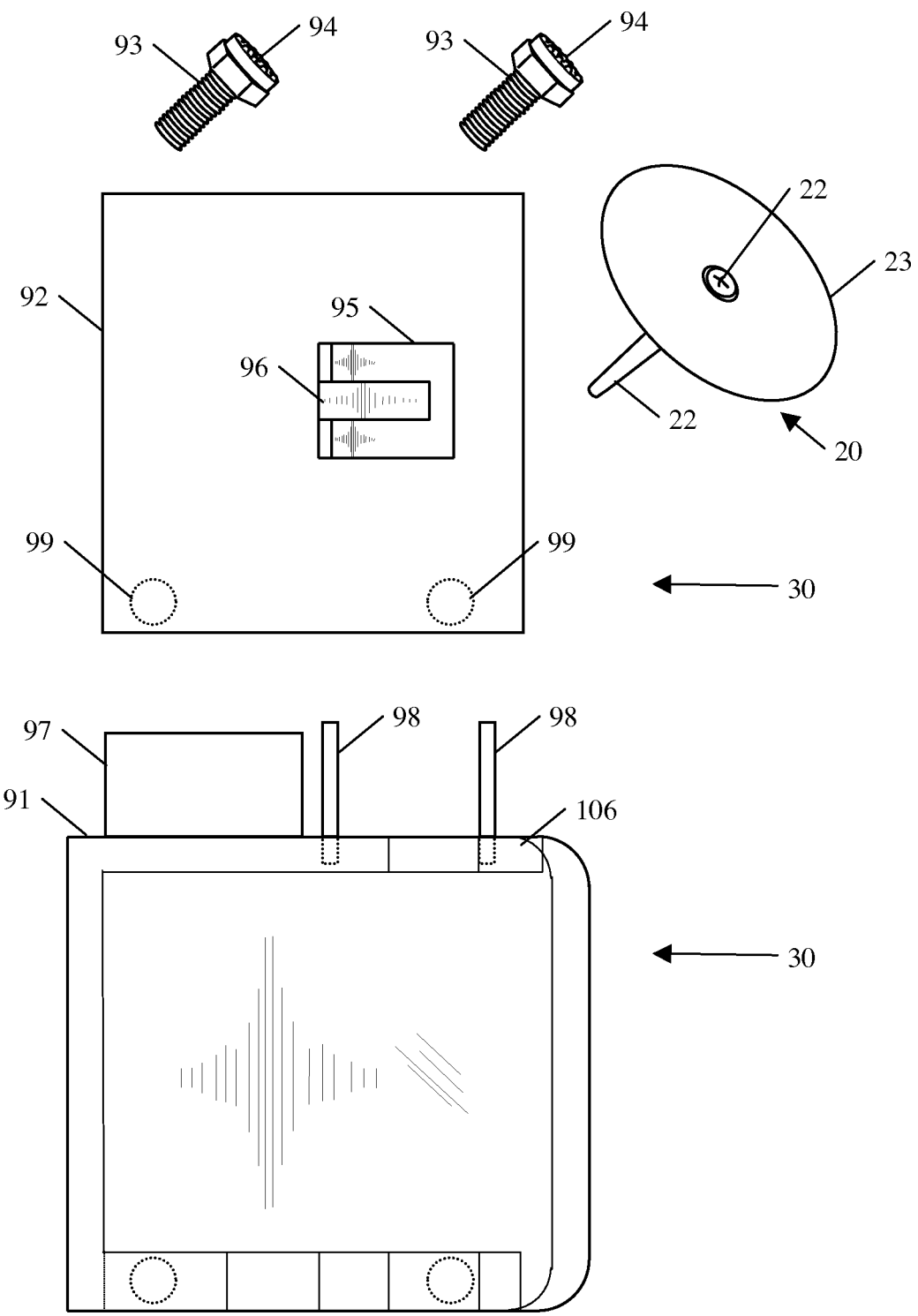
Figure 10:
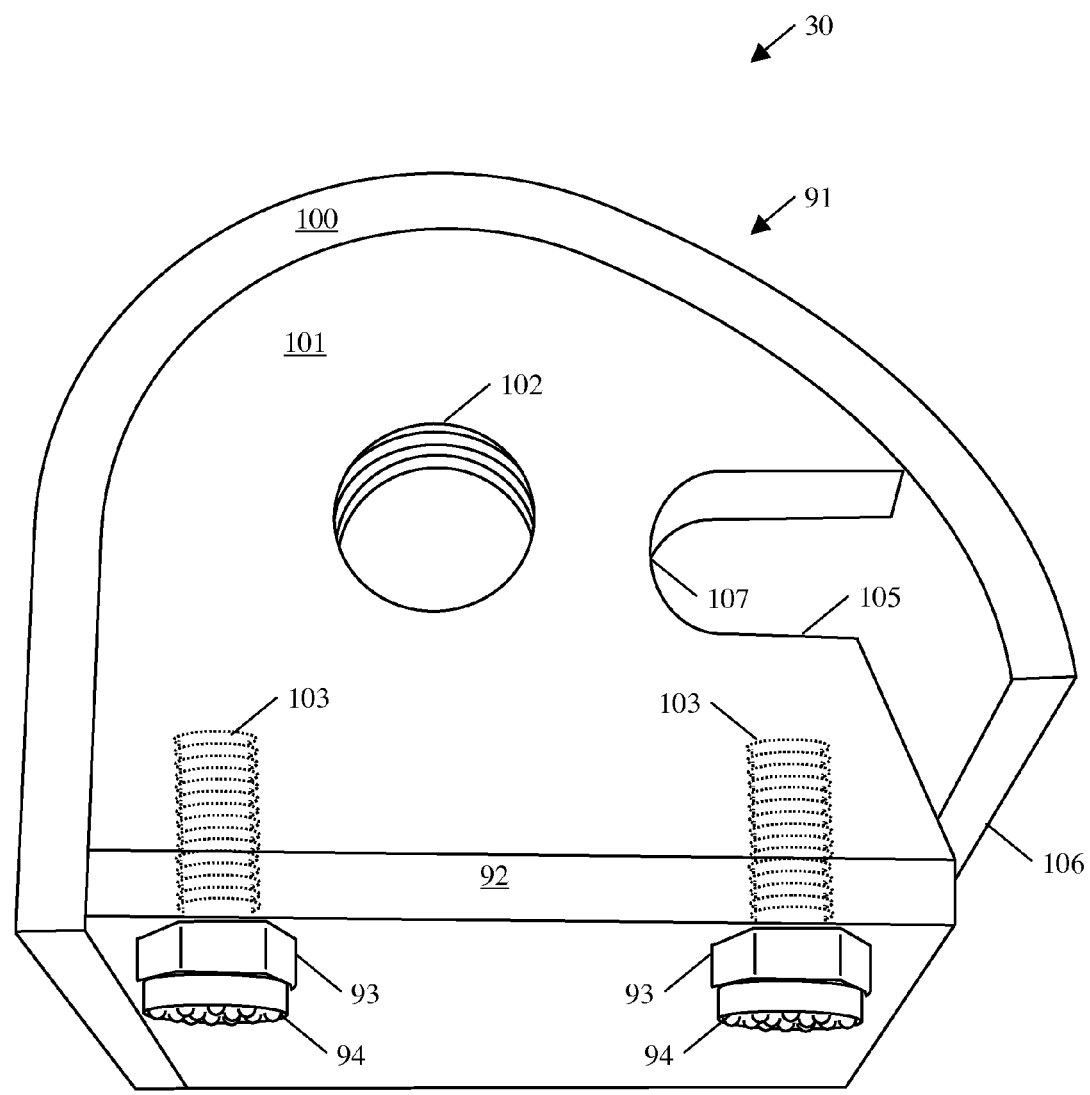
Figure 11:
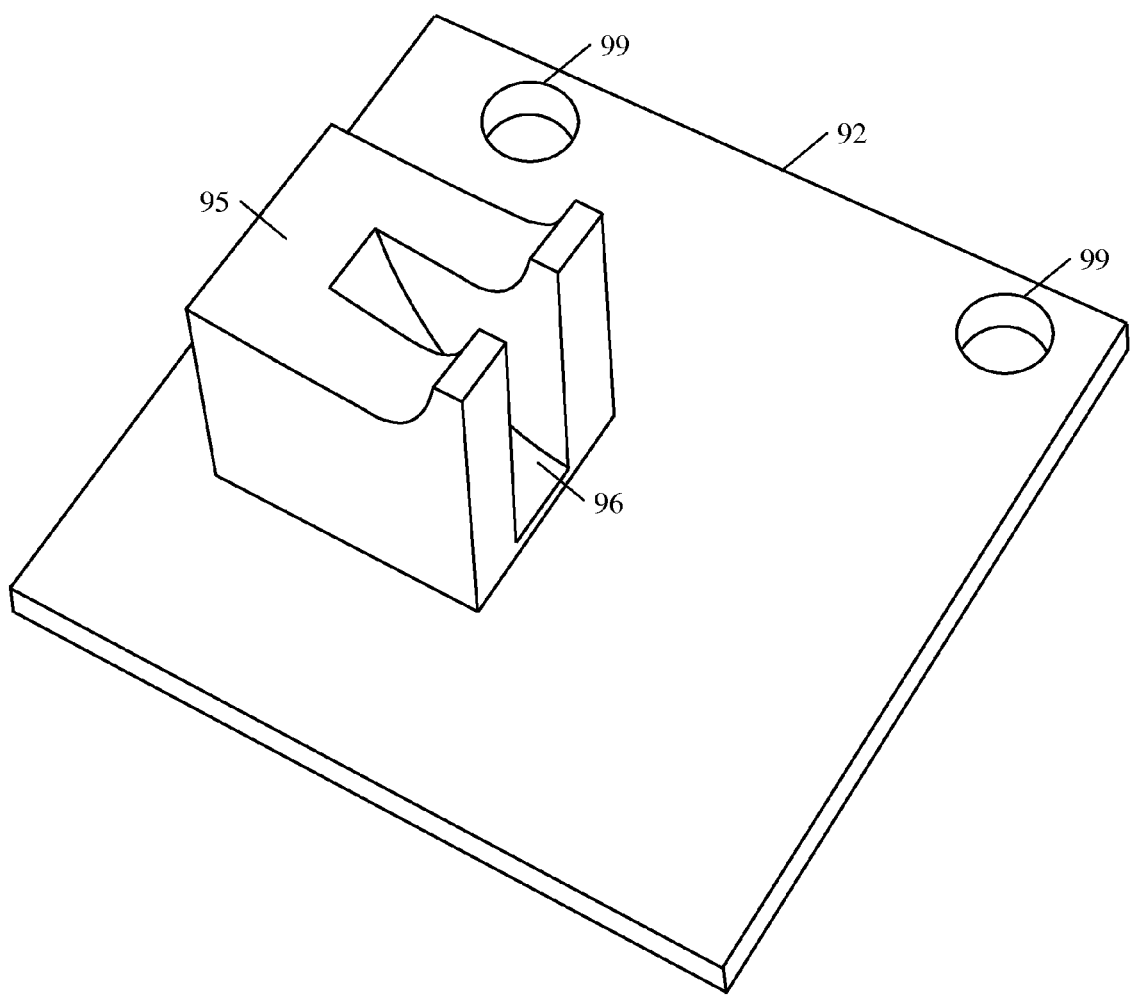
Figure 12:
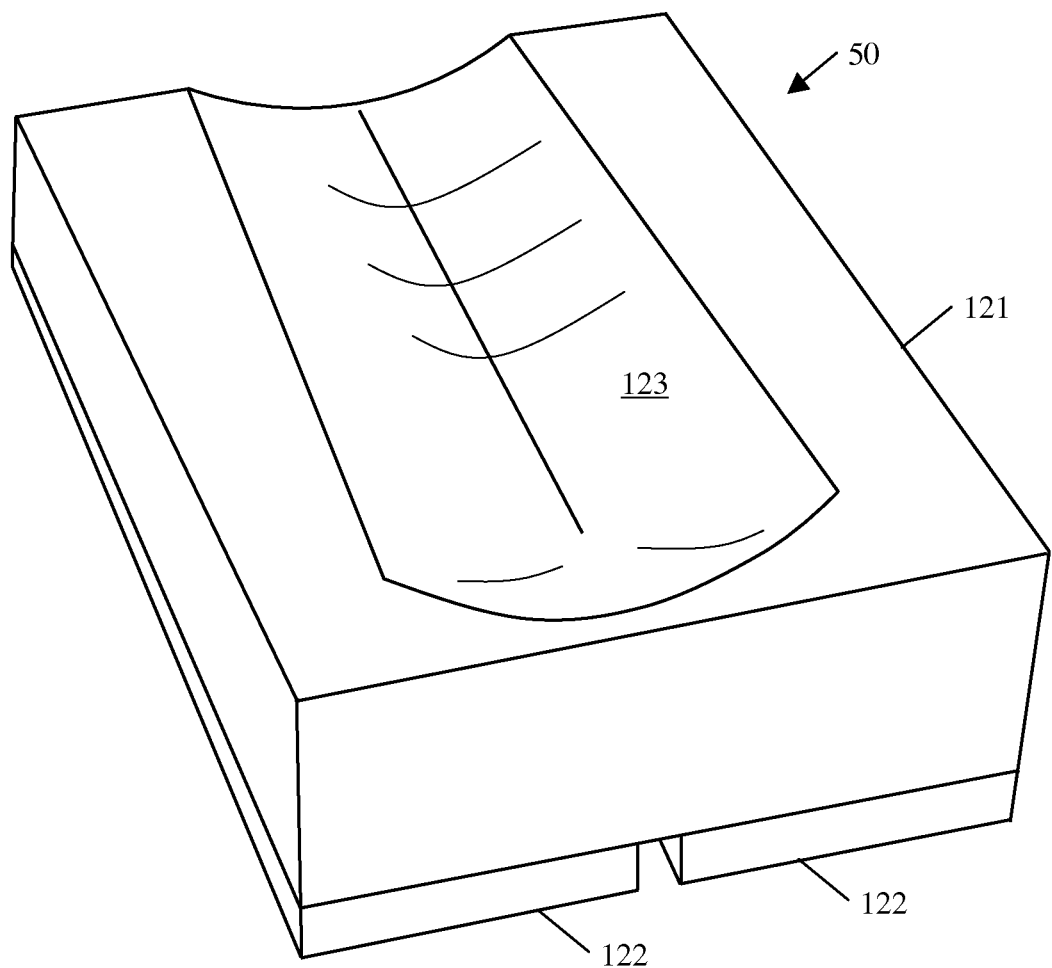
Figure 13:
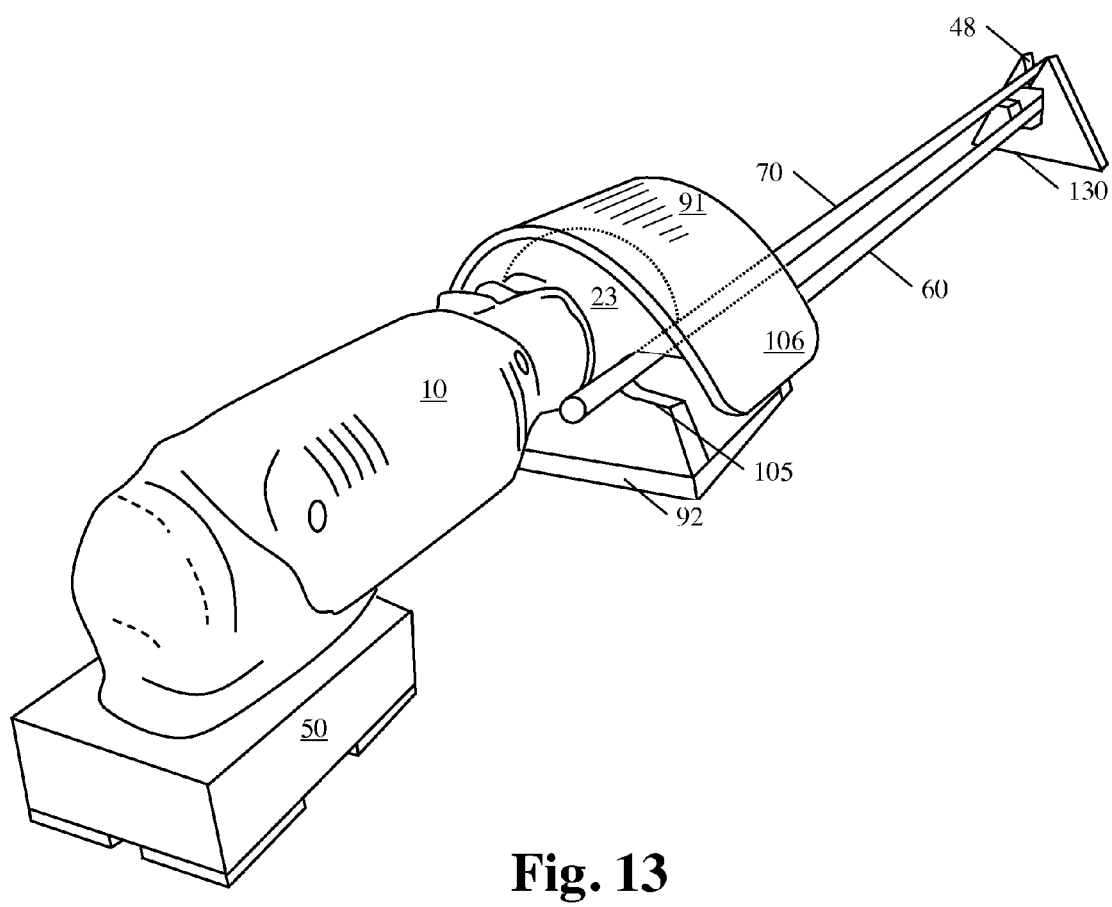
Figures 14, 15:
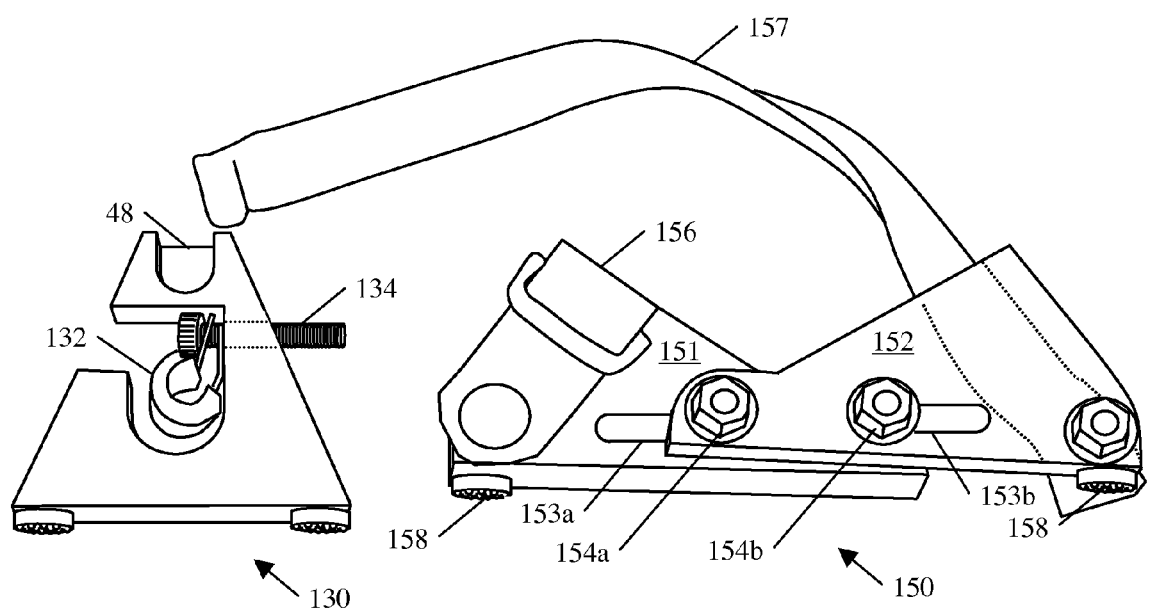
Figure 16A:
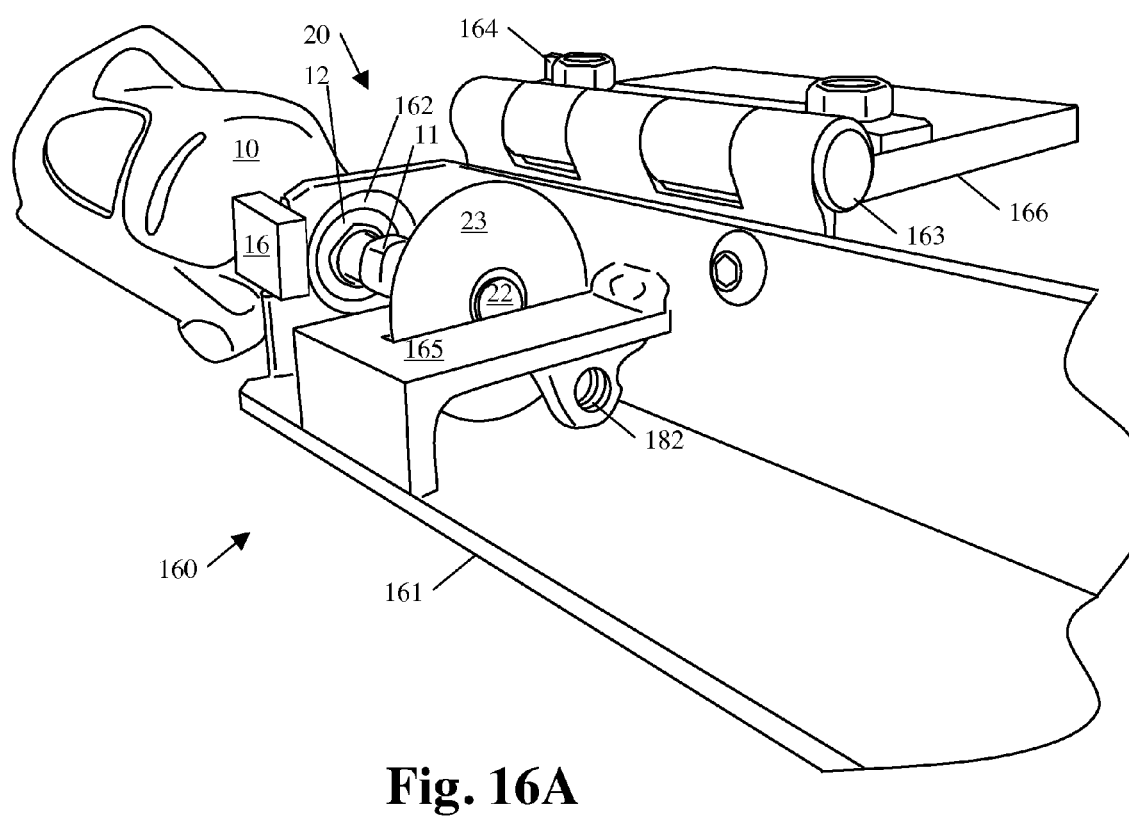
Figure 17:
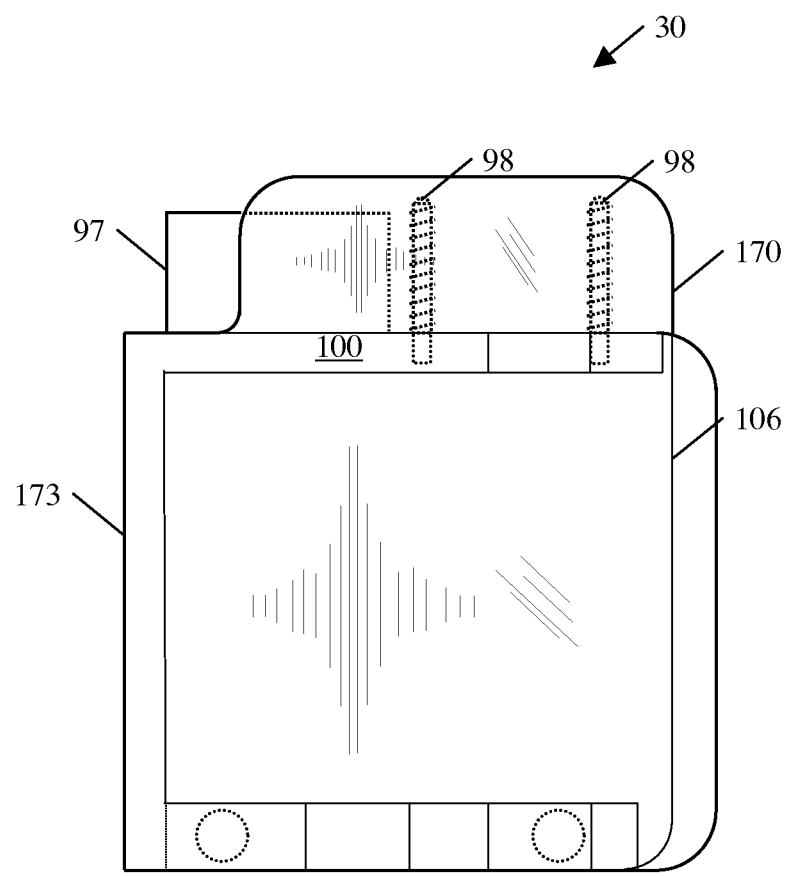
Figure 18A:
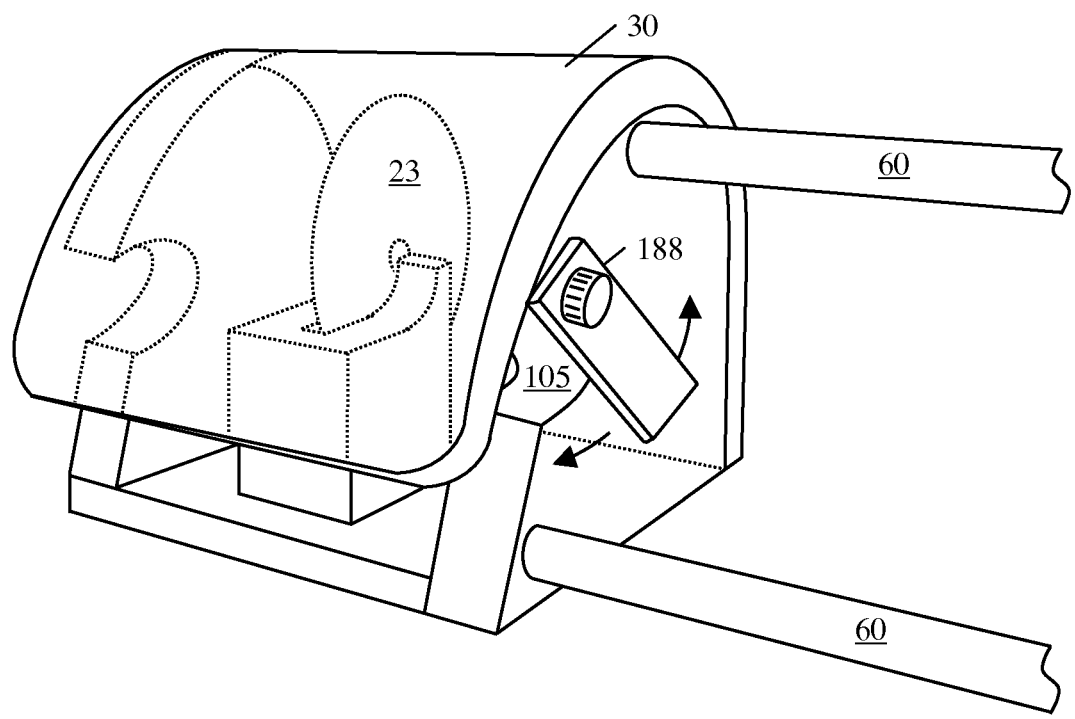
Figure 18B:
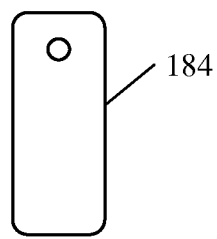

FIG. 1 shows components of a low cost arrow shaft rotary cutting system.
FIG. 2 shows an assembled embodiment a low cost arrow shaft rotary cutting system.
FIG. 3 shows details of a safety box with a rotary tool.
FIG. 4 shows details of an adjustable end piece.
FIG. 5 shows an exploded view of an end piece assembly.
FIG. 6 shows operation of system shafts in an end piece assembly.
FIG. 7 shows operation of a work shaft in an end piece assembly.
FIG. 8 shows a tip socket in a system shaft.
FIG. 9 shows a disassembled view of an embodiment of a safety box having a body and a base.
FIG. 10 shows details of the end of the safety box.
FIG. 11 shows details of the base of the safety box.
FIG. 12 shows a rotary tool support base.
FIG. 13 shows operation of an alternate end piece.
FIG. 14 shows details of an alternate end piece.
FIG. 15 shows details of an adjustable tool support.
FIGS. 16A through 16D show an angle iron embodiment of an arrow shaft rotary cutting system.
FIG. 17 shows a safety box with a screw shield.
FIGS. 18A and 18B show a depth guide for a safety box.
FIGS. 19A through 19M show various improvements for engaging the far end of the work shaft.
FIG. 20 shows another embodiment of a safety box base having an access cutout.

REFERENCE NUMERALS IN DRAWINGS 10 rotary tool
11 collet (chuck)
12 tool threads
13 power switch
14 speed selector
15 power cord
16 power cutoff switch
20 cutting assembly
22 blade attachment
23 cutting blade
30 safety box
40 end piece
41 end bottom 42 end top
43 end bottom pad
44 end screw cap
45 end screw
46 end screw nut
48 nock slot
49 system shall cutout
50 rotary tool support base
60 system shall
70 work shaft
71 nock
80 lip socket
91 safety box body
92 safely box base
93 box bolt
94 box pad
95 cutting table
96 blade cutout
97 vacuum attachment
98 system shaft screws
99 screw hole
100 box top
101 box side
102 tool mounting threads
103 box bolt receptacle
105 cutting slut
106 box shield
107 slot apex
121 base body
122 base pad
123 base contour
130 alternate end piece
132 bolt clamp loop
134 clamp bolt
150 adjustable tool support
151 first support element
152 second support element
153 first support opening
154 second support opening
156 strap with buckle
157 strap
158 element pad
160 angle iron box
161 angle iron
162 tool mounting
163 shield hinge
164 safely trigger
165 alternate cutting table
166 shield
167 sliding end piece
16S shaft hole
169 end piece bolt
170 screw shield
173 alternate safety box
180 guard
181 guard bolt
182 guard receptor
184 depth guide
188 depth guide boll
190 drilled hole
191 point receptor
192 bearing
194 nock receptor bushing
195 nock wall
196 pointed bushing
197 hushing point
198 nock replacement point
200 access cutout
202 cone pivot point
204 rounded pivot point
206 nock receiving point
208 rounded end

DESCRIPTION OF THE INVENTION

Arrow Shaft Rotary Cutting System

FIG. 1 shows components of a low cost arrow shaft rotary cutting system. The system comprises a rotary tool 10, cutting assembly 20, a safety box 30, an end piece 40 (see FIGS. 4 and 5).

The rotary tool 10 comprises a collet (or chuck) 11 for attaching a cutting assembly 20, tool threads 12 for attaching to the safety box 30, a power switch 13, preferably a speed selector 14, a power cord 15. A preferred rotary tool 10 is the Black and Decker RTX brand corded rotary tool. Dremel also makes rotary tools.

The cutting assembly 20 comprises blade attachment 22 and a cutting blade 23 (see FIG. 9). A preferred cutting blade is a two-inch diameter blade.

The safety box 30 comprises a box shield 106, tool mounting threads 102, system shaft screws 98, a vacuum attachment 97, a cutting table 95, and a blade cutout 96.

FIG. 2 shows an assembled view the low cost arrow shaft rotary cutting system. Two arrow shafts are fitted with tip sockets 80 (see FIG. 8) and are attached to system shaft screws 98 (see FIGS. 1, 3, 9, 17) to form two system shafts 60. The end piece 40 is then assembled by clamping the two system shafts 60 at a predetermined position to set the length of the arrow to be cut by a cutting blade 20 (not shown) attached a rotary tool 10 resting on a rotary tool support base 50, inside a safety box 30.

FIG. 3 shows details of a safety box 30 with a rotary tool 10 attached. The attachment of the system shafts 60 to the system shaft screws 98 using the tip sockets 80 is also shown (see FIG. 8). A measuring device can be used to set the precise length to be cut. In one embodiment, a measuring strip of paper or plastic can be attached to one of the system shafts 60.

The components shown in FIG. 1 are preferably packaged for retail sale in a plastic clamshell or case which is compact, relatively lightweight, and easily shipped and transported. Other components such as system shafts 60 and tip sockets 80 are purchased with the arrow making materials, such as uncut arrow shafts (60 and 70), nocks 71, feathers and vanes, tips, and tip sockets 80. These are preferably packaged separately, or combined in a larger starter kit from a particular manufacturer.

Adjustable End Piece

FIG. 4 shows details of an adjustable end piece.

The end piece 40 comprises an end bottom 41 and end top 42 which are held together by two end screws 45 which pass through the end top 42 and attached to end screw nuts 46 shown held in channels in the end bottom 41. Each end screw 45 further comprises an end screw cap 44. Preferably the end screw cap have a small diameter so that the operator is less likely to apply too much clamping force on the system shafts 60 (see FIGS. 2, 6, 7). Too much clamping force could damage, for example, a carbon fiber shaft.

Both the end bottom 41 and the end top 42 have system shaft cutouts 49 for receiving system shafts 60. A novel aspect of the end piece 40 is the structure and operation that allows the system to use system shafts 60 of different diameters and lengths being fully adjustable. The structure allows the center to of each shaft to be positioned with substantially the same distance and orientation as the system shaft screws 98 (see FIGS. 2 and 3).

Optional end bottom pads 43 are attached to the end bottom 41 and provide friction between the end piece and the surface upon which it rests during operation.

In this embodiment, the end top 42 comprises nock slot 48 for receiving the nock 71 of the work shaft 70 (see FIGS. 6, 7). Other embodiments are described in reference to FIGS. 19A through 19M.

FIG. 5 shows an exploded view of the end piece 40 (see FIG. 4).

FIG. 6 shows operation of system shafts 60 in an end piece 40 assembly. The end piece 40 attaches to the far end of the system shafts 60. The end piece 40 can slide along the entire length of the system shafts 60 to any desired position. The end screw caps 44 are manually tightened to clamp around the systems shafts 60 which are held between the system shaft cutouts 49. The work shaft 70 (any uncut shaft) is fitted with a nock 71 and rests inside the nock slot 48.

FIG. 7 shows operation of a work shaft 70 in an end piece 40. After the operator has adjusted the end piece 40 to the desired position, the work shaft 70 (any uncut shaft) is fitted with a nock 71. The nock 71 is placed in the nock slot 48 that holds the nock 71 and allows it to rotate in place. The work shaft 70 is then cut by placing the other end inside the safety box 30 (similar to the position shown in FIG. 13 using a different embodiment of an end piece). The systems shafts 60 which are held between the system shaft cutouts 49 of the end piece 40.

System Shafts

FIG. 8 shows a tip socket 80 in a system shaft 60. The tip socket 80 is a conventional tip socket that is configured to match the lumen of a particular arrow shaft. It is used to allow the operator to configure the system using shafts that are themselves being cut to make customized arrows. After the shafts are cut, the tip socket 80 may be used to attach the desired arrow tip or arrow head.

A novel aspect of the present invention is the use of any arrow shafts as system shafts 60. This allows compact packaging, shipping, and transportation of the components shown, for example, in FIG. 1. It also allows for easy replacement should any of the system shafts 60 break or should a different size be needed.

Safety Box

FIG. 9 shows a disassembled view of an embodiment of a safety box having a body and a base. This embodiment of a safety box 30 comprises a safety box body 91 and a safety box base 92, held together by two box bolts 93. The box bolts 93 pass through screw holes 99 in the safety box base 92 and engage threads in the safety box body 91 (see box bolt receptacles 103 in FIG. 10). Each box bolt 93 is shown with a box pad 94 attached. Preferably, the box bolt 93 has a large diameter head for easy manual disassembly and reassembly.

In this embodiment, a cutting table 95 is formed in the safety box base 92. The cutting table 95 comprises a blade cutout 96 that allows the cutting blade 23 to rotate in the proper position in relation to the cutting table 95.

In this embodiment, the safety box body 91 comprises system shaft screws 98 and a vacuum attachment 97. A vacuum hose may be attached to the vacuum attachment to vacuum away the dust the results from the cutting process. Preferably the vacuum has a HEPA filter.

Two-piece embodiments such as the one shown in FIG. 9 have novel built in safety aspects. The cutting assembly 20 attaches to a rotary tool via the blade attachment 22. There needs to be a way to get the cutting assembly 20 out of the safety box, for example, to replace a broken or worn blade. However, when in an operable state, the safety box preferably forces the operator to have the cutting bade 23 fully enclosed and guarded in order use the system to cut an arrow shaft. By configuring cutting table 95 as part of the safety box base 92, unless the safety box base 92 is properly configured with the safety box body 91, the system not usable and the misconfiguration is obvious to the user.

The various embodiments of a safety box are preferably made of clear plastic, such as polycarbonate. They may be molded or formed from welded parts.

FIG. 10 shows details of the end of the safety box 30. The safety box body 91 is formed by a rounded box top 100 attached to a box side 101. Tool mounting threads 102 are formed in one box side 101 and are configured to receive the tool threads 12 of the rotary tool 10. Box bolt receptacles 103 are show threaded from the bottom of the one box side 101. Each box side 101 has a void forming a cutting slot 105, which allows the work shaft 70 (not shown) to enter the safety box 30 under the box shield 106. The box shield 106 is an extension of the box top 100 beyond the opening of the cutting slot 105. The slot apex 107 is the farthest point that the shaft can enter the safety box 30.

FIG. 10 also shows that when configured the cutting table 95 position, on safety box base 92, corresponds to the slot apex 107 and together they prevent the work shaft 70 from passing close to the center of the cutting blade 23.

Each box bolt 93 is shown with a box pad 94 and attaches the safety box base to the box side 101 via the box bolt receptacles 103.

FIG. 11 shows the details of the safety box base 92 (see FIG. 9).

Rotary Tool Support Base

FIG. 12 shows a rotary tool support base. The rotary tool support base 50 comprises a base body 121 having a contoured surface, base contour 123, that matches the bottom end of the rotary tool 10 (not shown) (see FIGS. 2 and 13). A base pad 122 is shown on the bottom to provide friction with the surface upon which it sits and to provide some damping of vibrations.

However, good results have been obtained without using the rotary tool support base 50, because the rotary tool 10 is attached securely to the safety box 30 that has sufficient pads.

Alternate End Piece

FIG. 13 shows operation of an alternate end piece 130. The alternate end piece 130 uses a single system shaft 60 that is held in place by a single bolt clamp loop (see FIG. 14 for details). The work shaft 70 is placed in the alternate end piece 130, via a nock slot 48, and the other end to be cut is passed under the box shield 106 through the cutting slot 105 onto the cutting table 95 (not shown) where it is cut the cutting blade 23 of the cutting assembly 20. For best results the operator rotates the work shaft 70 where only the wall of the hollow work shaft 70 is cut.

FIG. 14 shows details of an alternate end piece. The alternate end piece 130 uses a single system shaft 60 (not shown) that is held in place by a single bolt clamp loop 132 that is tightened by a clamp bolt 134. The work shaft 70 is placed in the alternate end piece 130, via a nock slot 48.

Adjustable Tool Support

FIG. 15 shows details of an adjustable tool support 150, which has a similar function to the rotary tool support base 50. The adjustable tool support 150, however, is adjustable to fit any make and model of rotary tools. This would allow a packaging configuration that excludes the rotary tool 10 and allows the operator to use rotary tool 10 which is already in the possession of the operator. This lowers the cost, weight, and size of the retail package configuration (compared to, for example, the set of components shown in FIG. 1).

The adjustable tool support 150 comprises two support elements (151 and 152) each having a support opening (153 and 154, respectively), which allow the two elements to be slidably connected with bolts. The height of the tool may be controlled by sliding the two elements in relation to each other and tightening the bolts. Any sized rotary tool 10 may then be secured to the adjustable tool support 150 using the strap 157 and strap with buckle 156. Each support elements (151 and 152) may optionally have element pads 158.

Angle Iron Embodiment

FIGS. 16A through 16D show an angle iron embodiment of an arrow shaft rotary cutting system. The angle iron box 160 in this embodiment is made from a length of angle iron 161, tool mounting 162 threaded member, a shield hinge 163, and alternate cutting table 165. A clear shield 166 and a safety trigger 164 are attached to the shield hinge 163. The safety trigger 164 engages a power cutoff switch 16 which controls power going to the rotary tool 10, such that when the shield 166 is raised no power is provided to the rotary tool 10.

Figure 16B:
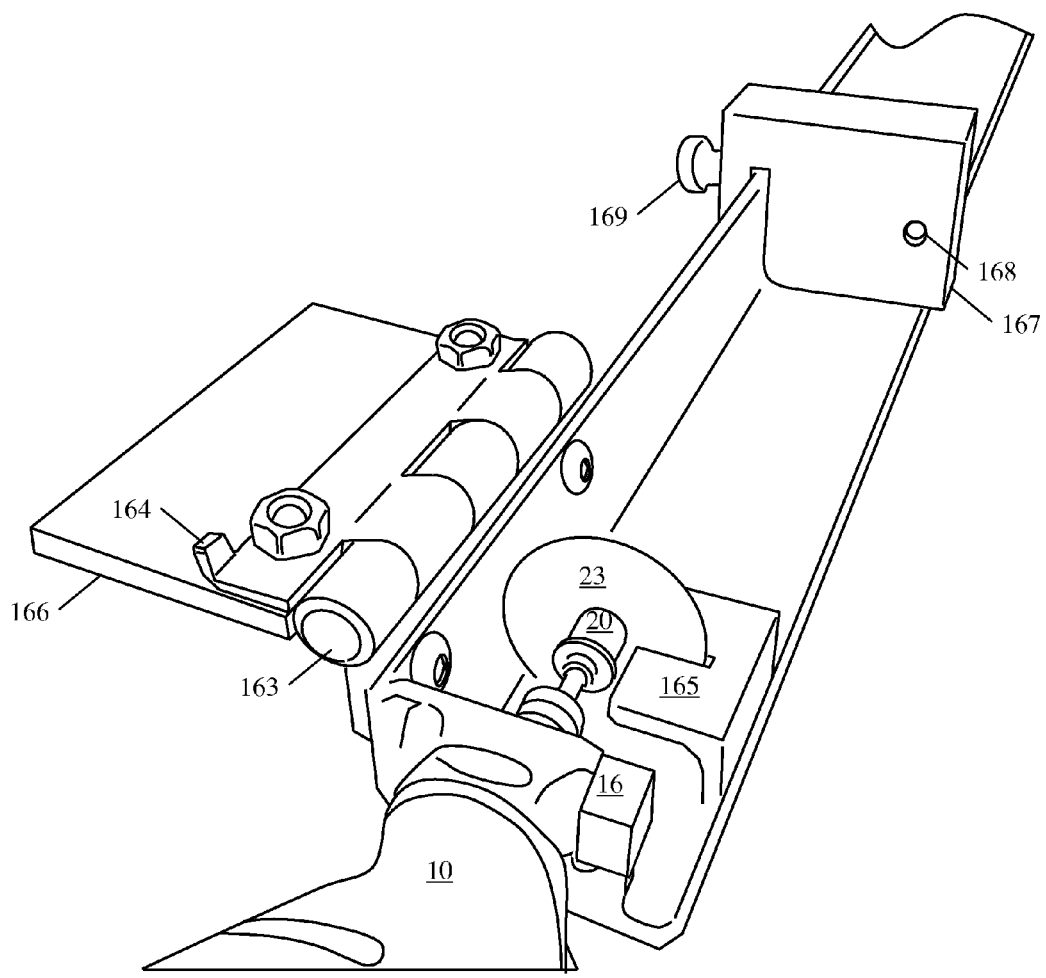

FIG. 16B shows sliding end piece 167 having a shaft hole 168. The sliding end piece 167 may be positioned anywhere along the top edge of the angle iron 161 and held in place by an end piece bolt 169.

During cutting, the work shaft 70 passes through the shaft hole 168 and rests on the alternate cutting table 165.

Figure 16C:
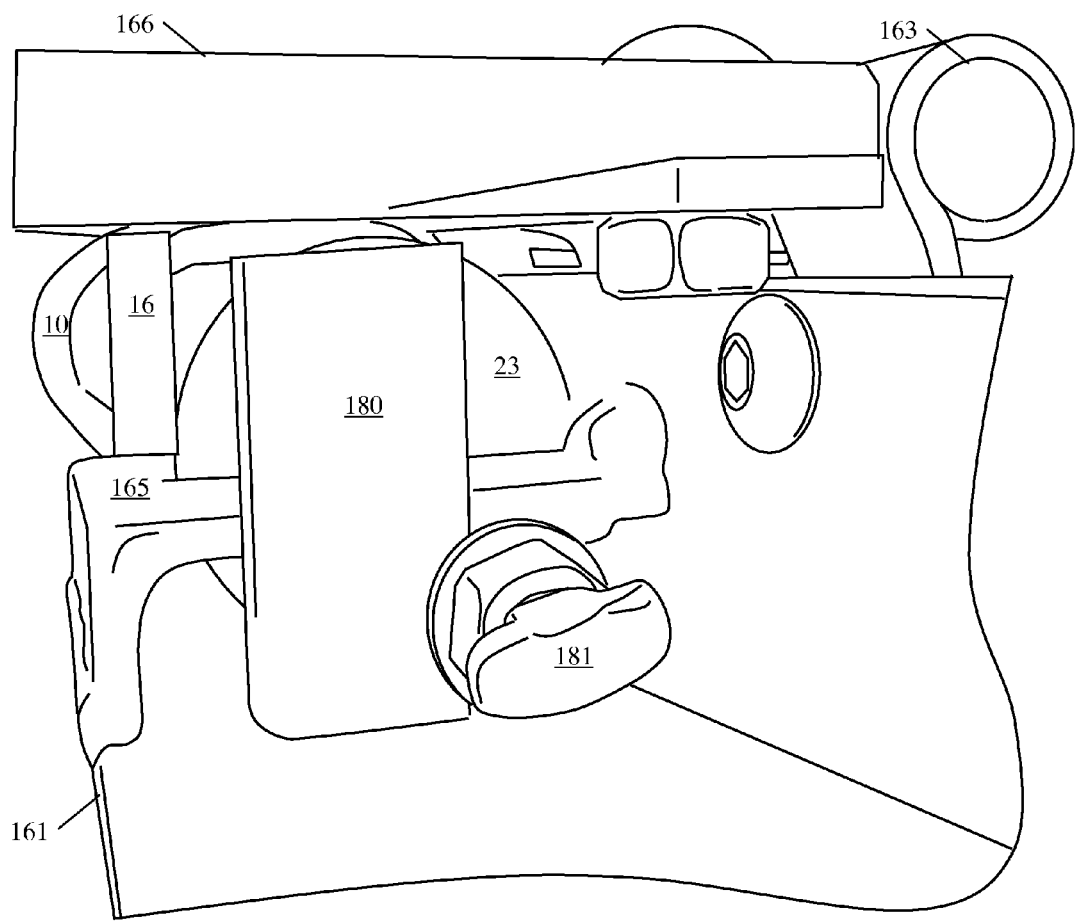

In one embodiment, as shown in FIG. 16C, a guard 180 may be attached to alternate cutting table 165 with a guard bolt 181, via a guard receptor 182 (shown in FIG. 16A). This allows the cutting blade to be protected from the top, left, and right.

It yet another embodiment, not shown, the shield 166 could have an extension that covers the front of the cutting area (similar to the configuration of the box shield 106 in the safety box 30 configuration.

The angle iron embodiments are heavy duty; however, the safety box embodiments (such as shown in FIGS. 1, 17, 20) have the advantage of being lighter weight, easier to package, ship, transport, and store.

Figure 16D:
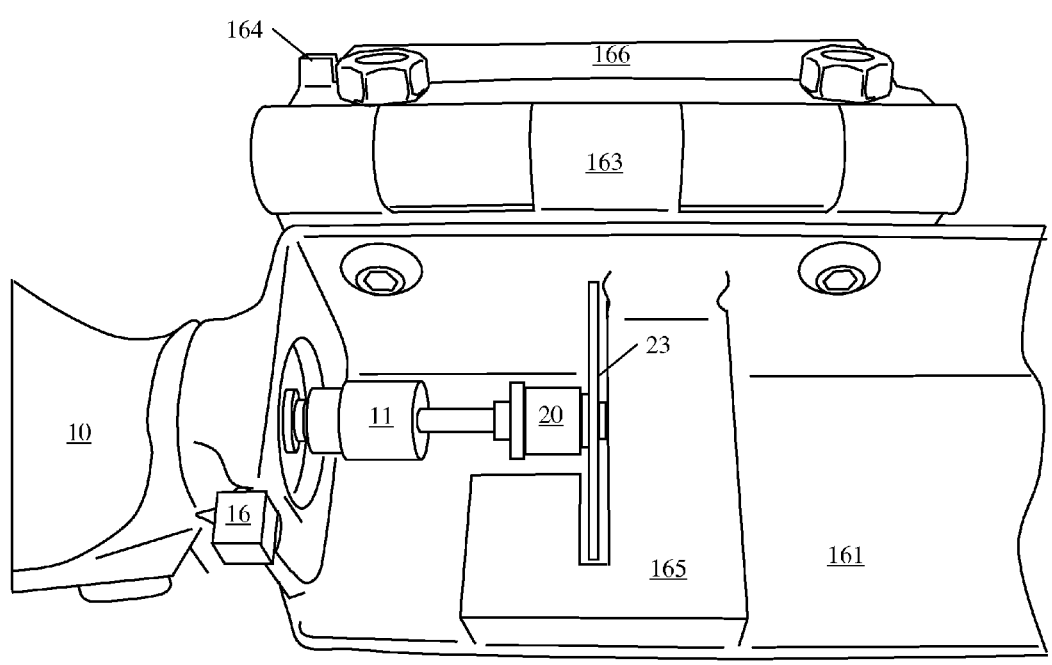

FIG. 16D shows an alternate view of the angle iron embodiment.

FIG. 17

FIG. 17 shows an embodiment safety box 30 with a screw shield 170, namely alternate safety box 173. The screw shield 170 is an extension of the box top 100 (FIG. 10), which shields the system shaft screws 98 from breakage during packaging and shipping. Further, the screw shield 170 may protect the operator from accidental injury.

Safety Box Depth Guide

FIGS. 18A and 18B show a optional depth guide for a safety box 30, such as those shown, for example, in FIGS. 1 and 17). The depth guide 184 is attached to the safety box 30 with a depth guide bolt 188. The depth guide 184 may be positioned by rotating it about the axis of the depth guide bolt 188 to set the desired depth of the cut, and then locked in place by tightening the depth guide bolt 188.

This allows for fine adjustment of the cutting depth to match the wall thickness of a particular set of arrow shafts (70) and to account for wear down of the cutting blade 23 over time.

High Precision Embodiments

FIGS. 19A through 19M show various improvements for engaging the far end of the work shaft.

Good results have been obtained by using a convention nock 71 in the simple nock slot 48 of the end piece 40 (for example as shown in FIG. 7). However, some operators or manufactures may want spend more for higher precision embodiments.

Figure 19A:
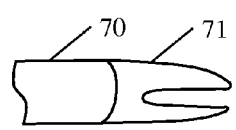

FIG. 19A shows the work shaft 70 with a conventional nock 71. A conventional nock 71 may have some movement off center, or friction, when rotating in the simple nock slot 48. See below regarding FIG. 19J and FIG. 19K.

Figure 19C:
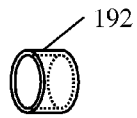
Figure 19B:
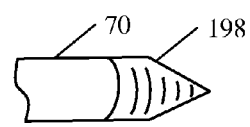
Figure 19F:
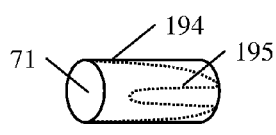

FIG. 19B shows a nock replacement point 198 that may be used instead of the convention nock 71 during the cutting process. The replacement point 198 provides a sharp center point for rotation which could engage an improved end piece having a point receptor 191, such as shown in FIG. 19E.

Figure 19D:
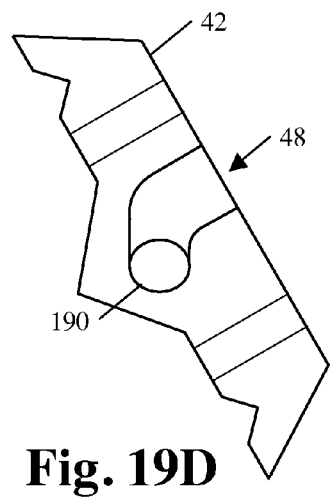
Figure 19H:
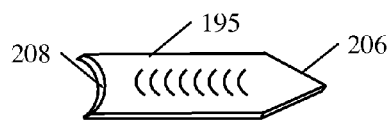

FIG. 19C shows a bearing 192 which could be placed in yet another improved end piece having a drilled hole 190, such as shown in FIG. 19D. The bearing 192 would engage the conventional nock 71 (FIG. 19A) and reduce friction.

FIG. 19F shows a nock receptor bushing 194 having an internal nock wall 195 for engaging the string opening in the nock 71. In the embodiment shown, the "bottom of the barrel" of the bushing is substantially V-shaped to tightly engage the nock 71.

Figure 19G:
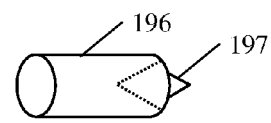
Figure 19I:
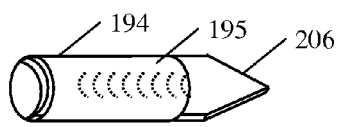

FIG. 19G shows yet another bushing, a pointed bushing 196 having a bushing point 197 for reducing the friction on the bushing (without the expense of the bearing of FIG. 19C). The bushing point 197 provides a sharp center point for rotation which could engage an improved end piece having a point receptor 191, such as shown in FIG. 19E.

FIG. 19H shows a nock receiving point 206 having a rounded end 208 for engaging the string opening in the nock 71. FIG. 19I shows an embodiment of FIG. 19H where a nock receptor bushing 194 having an internal nock wall 195 for engaging the string opening in the nock 71. The nock receiving point 206 provides a sharp center point for rotation which could engage an improved end piece having a point receptor 191, such as shown in FIG. 19E.

Figure 19J:
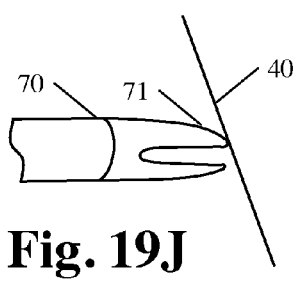
Figure 19K:
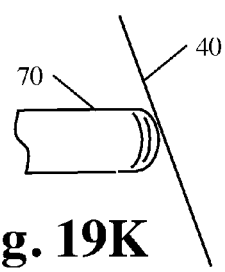
Figure 19E:
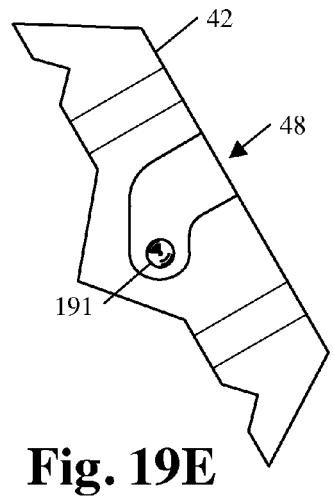
Figure 20:
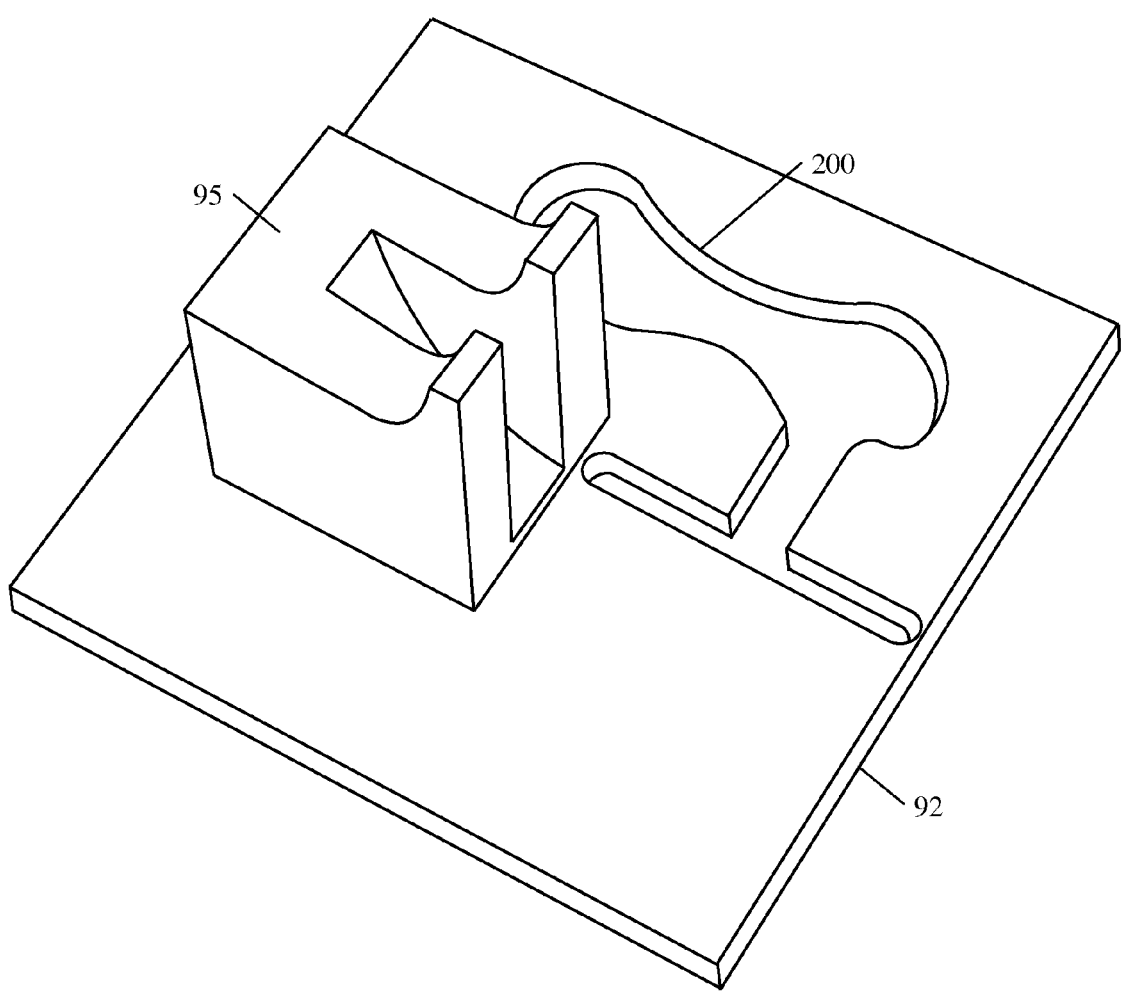

FIGS. 19J and 19K illustrate the precision cutting problem encountered when the end piece 40 is not orthogonal with the work shaft 70. The work shaft 70 will not be rotated smoothly and, ultimately, will not provide accurate cutting. The nock 71 has two members which when rotated in the simple nock slot 48 will move up and down as the nock 71 turns. This will lead to some vibration in the work shaft 70 and undesired pressure on the cutting blade 23.

The embodiments shown in FIG. 19D and FIG. 19E could be used with the conventional nock 71, as well as with the various options shown in FIGS. 19B, 19C, 19F, 19G, 19H and 19I.

Figure 19L:
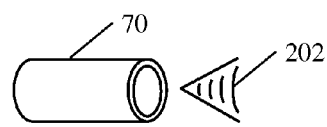
Figure 19M:
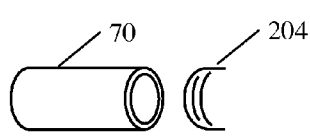

Alternative embodiments shown in FIG. 19L and FIG. 19M illustrate inserting members that fit into a work shaft 70 and ensure that the center point for rotation is always obtained. FIG. 19L illustrates the cone pivot point 202 embodiment, while FIG. 19M illustrates the rounded pivot point 204 embodiment. Each of the cone pivot point 202 and the rounded pivot point 204 could be attached in the end piece 40 in the simple nock slot 48 (e.g. FIG. 6) or the drilled hole 190 (FIG. 19D), and then engage the work shaft 70.

Permanently Closed Safety Box

FIG. 20 shows another embodiment of a safety box base 92 having an access cutout 200. Embodiments that use this safety box base 92 could permanently attach the safety box base 92 to the safety box body 91 during the manufacturing process. As shown, the access cutout has a first portion shaped to allow passage of the cutting assembly 20, and a second portion, which would allow temporary access of the operator fingers or a tool to tighten the collet 11. The first portion is offset from where the blade is positioned when attached to the rotary tool 10. This requires the operator to pass the cutting assembly 20 into the permanently closed safety box 30 and then position the blade into the blade cutout 96 of the cutting table 95. Once in position the cutting assembly 20 could be attached to the collet 11 and tightened using the fingers or tool, such as a wrench. This novel structure provides for even more safety against an operator forgetting to attach the safety box base 92.

Advantages

Adjustable

The preferred embodiments of these arrow shaft rotary cutting systems are adjustable to support cutting arrow shafts of different diameter, wall thickness, and length.

Increased Safety

The safety box concepts and shields of the embodiments provide increased safety.

Lightweight

These arrow shaft rotary cutting systems are lightweight.

Low Cost

These arrow shaft rotary cutting systems are low cost. They can be made with less material than the conventional arrow saws. High precision can be achieved using readily available, lower cost rotary tools. With some embodiments, the cost of the cutting motor and blade is eliminated by using an existing rotary tool.

Simple to Make and Manufacture

These arrow shaft rotary cutting systems are easy to make or to manufacture, having a simpler set of parts and configuration.

Easy to Store

These arrow shaft rotary cutting systems are easy to store.

Easy to Transport

These arrow shaft rotary cutting systems are easy to transport.

Easy to Package and Ship

These minimal set of components some embodiments of these arrow shaft rotary cutting systems can be shipped easily, compared to having to ship the full system. Various sets of components can be packaged in plastic clamshells or cases, or alternative combined with a set of arrow shafts and components for as a starter kit.

Easy to Use

These arrow shaft rotary cutting systems are easy to use safely.

Easy to Manufacture

These arrow shaft rotary cutting systems are made of parts with consistent sizes, which minimize manufacturing and make assembly and disassembly easier.

Conclusion, Ramification, And Scope

Accordingly, the reader will see that the improved adjustable, lightweight, portable, low cost arrow shaft rotary cutting systems are easy to use and transport, and importantly provide greater safety.

While the above descriptions contain several specifics these should not be construed as limitations on the scope of the invention, but rather as examples of some of the preferred embodiments thereof. Many other variations are possible. For example, the components can be manufactured in different ways and/or in different shapes to increase precision, reduce material, or simplify manufacturing. The variations could be used without departing from the scope and spirit of the novel features of the present invention.

Accordingly, the scope of the invention should be determined not by the illustrated embodiments, but by the appended claims and their legal equivalents.

We claim:

1. An arrow shaft rotary cutting system for use with a rotary tool to cut an arrow shaft, the rotary tool configured to receive and rotate a cutting blade, the system comprising a safety box and an end piece,
   wherein the safety box is configured to mount the rotary cutting tool,
   the safety box comprising:
   a) a cutting table, configured to hold the arrow shaft being cut at a predetermined height, the cutting table having a blade cutout configured to allow the cutting blade to pass through the cutting table,
   b) a first box side, having tool mounting threads,
   c) a second box side, and
   d) a box shield, the box shield comprising clear material,
   wherein when cutting the arrow shaft, the cutting table holds the arrow shaft in position in relation to the cutting blade and the box shield prevents injury to a human user,
   wherein the safety box is divided into a safety box base and a safety box body,
   wherein the safety box body is configured to be removeably attached to the safety box base,
   wherein the safety box base holds the cutting table,
   wherein the safety box body integrates the first box side and the box shield,
   wherein the first box side and the second box side each comprise a cutting slot configured to allow the arrow shaft to shaft to pass through the safety box under the box shield and rest upon the cutting table
   wherein the end piece extends from the second box side at a predetermined distance from the blade cutout, and is configured to hold a free end of the arrow shaft being cut at the same predetermined height as the cutting table,
   whereby the system holds the arrow shaft horizontally at the predetermined height.

2. The system of claim 1,
   wherein the second box side further comprises at least two system shaft screws, each system shaft screw configured to receive a tip socket attached to a respective system shaft.

3. The system of claim 2,
   wherein the end piece is configured to receive the system shafts,
   wherein the predetermined distance determines the length of the arrow shaft when cut.

4. The system of claim 1, further comprising a measuring device attached relative to the blade cutout,
   wherein the end piece is configured to slide relative to the measuring device and to be held at a set distance from the blade cutout, wherein the set distance determines the length of the arrow shaft when cut.

5. The system of claim 1, wherein the end piece comprises:
   i) an end bottom, and
   ii) an end top, adjustably connected to the end bottom,
   wherein at least one of the end bottom and end top have system shaft cutouts configured to receive a system shaft,
   wherein the end piece is held at a predetermined distance from the blade cutout,
   wherein the predetermined distance determines the length of the arrow shaft when cut.

6. The system of claim 1, wherein the end piece comprises a nock slot,
   wherein the nock slot is configured to slidably receive the free end of the arrow shaft being cut and to allow the arrow shaft to rotate around a substantially fixed axis while being cut.

7. The system of claim 6, wherein the system further comprises a bearing configured to allow the free end of the arrow shaft to rotate freely in the nock slot.

8. The system of claim 6, wherein the system further comprises a nock receptor bushing configured to allow the free end of the arrow shaft to rotate freely in the nock slot.

9. The system of claim 1, wherein the end piece comprises a point receptor,
   wherein the point receptor is configured to receive a point on the free end of the arrow shaft being cut and to allow the arrow shaft to rotate around a substantially fixed axis while being cut.

10. The system of claim 9, wherein the point is one of:
    i) nock replacement point, attached to the arrow shaft in place of an arrow shaft nock,
    ii) nock receiving point, configured to engage the arrow shaft nock, and
    iii) a pointed bushing, configured to engage the arrow shaft nock.

11. The system of claim 1, wherein the end piece comprises one of:
    i) a cone pivot point configured to engage the arrow shaft, and
    ii) a rounded pivot point configured to engage the arrow shaft.

12. The system of claim 1,
    wherein the second box side further comprises vacuum attachment.

13. The system of claim 2,
    wherein the second box side further comprises a screw shield,
    whereby the system shaft screws are protected from breaking off of the safety box, and
    whereby the user is protected from injury from the system shaft screws.

14. The system of claim 1,
    wherein the safety box base further comprises a cutting blade access cutout, and
    wherein the access cutout is configured to allow the user to replace the cutting blade through the access cutout,
    whereby the user cuts the arrow shaft when the cutting blade is secured inside the safety box,
    whereby the user is protected by the safety box when the system is positioned for cutting operation.

15. An arrow shaft rotary cutting system for use with a rotary tool to cut an arrow shaft, the rotary tool configured to receive and rotate a cutting blade, the system comprising a safety box and an end piece,
    wherein the safety box is configured to mount the rotary cutting tool,
    the safety box comprising:
    a) a cutting table, configured to hold the arrow shaft being cut at a predetermined height, the cutting table having a blade cutout configured to allow the cutting blade to pass through at least a portion of the cutting table;
    b) a first box side, having tool mounting threads;
    c) a second box side; and
    d) a box shield, the box shield comprising clear plastic,
    wherein the safety box is divided into a safety box base and a safety box body,
    wherein the safety box body is configured to be removeably attached to the safety box base,
    wherein the safety box base holds the cutting table,
    wherein the safety box body integrates the first box side, the second box side, and the box shield,
    wherein the first box side and the second box side each comprise a cutting slot configured to allow the arrow shaft to pass through the safety box under the box shield and rest upon the cutting table,
    wherein the second box side further comprises at least two system shaft screws, each system shaft screw configured to receive a tip socket attached to a respective system shaft,
    wherein the end piece comprises:
    i) an end bottom, and
    ii) an end top, connected to the end bottom,
    wherein at least one of the end bottom and end top have system shaft cutouts configured to receive the system shafts,
    wherein the end piece is held at a predetermined distance from the blade cutout, wherein the predetermined distance determines the length of the arrow shaft when cut,
    wherein the end piece further comprises at least one of:
    iii) a nock slot, wherein the nock slot is configured to slidably receive a free end of the arrow shaft being cut and to allow the arrow shaft to rotate around a fixed axis while being cut, and
    iv) a point receptor, wherein the point receptor is configured to receive a point on the free end of the arrow shaft being cut and to allow the arrow shaft to rotate around a substantially fixed axis while being cut,
    wherein the end piece is configured to hold the free end of the arrow shaft being cut at the same predetermined height as the cutting table,
    wherein when cutting the arrow shaft, the cutting table holds the arrow shaft in position in relation to the cutting blade and the box shield prevents injury to a human user,
    whereby the system holds the arrow shaft horizontally at the predetermined height,
    whereby the user cuts the arrow shaft when the safety box body is attached to the safety box base, and
    whereby the user removes the safety box base from the safety box body to replace the cutting blade.

* * * * *